No. 888,599. PATENTED MAY 26, 1908.
E. EK.
METER.
APPLICATION FILED JULY 3, 1906.

3 SHEETS—SHEET 1.

Witnesses:
Jas. E. Hutchinson
Thos. R. Strath

Inventor:
Emil Ek,
By Maxwillans Attorneys

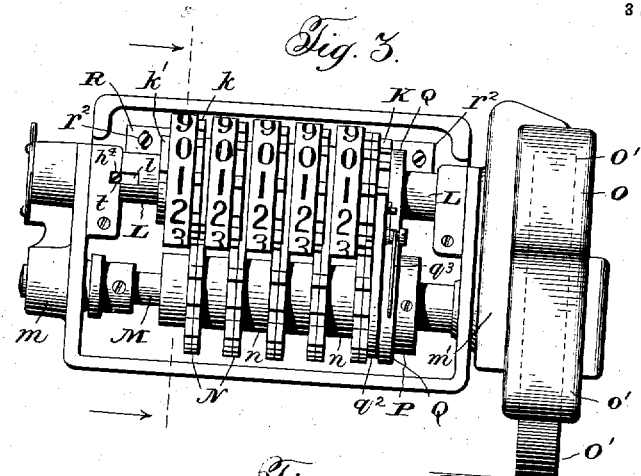
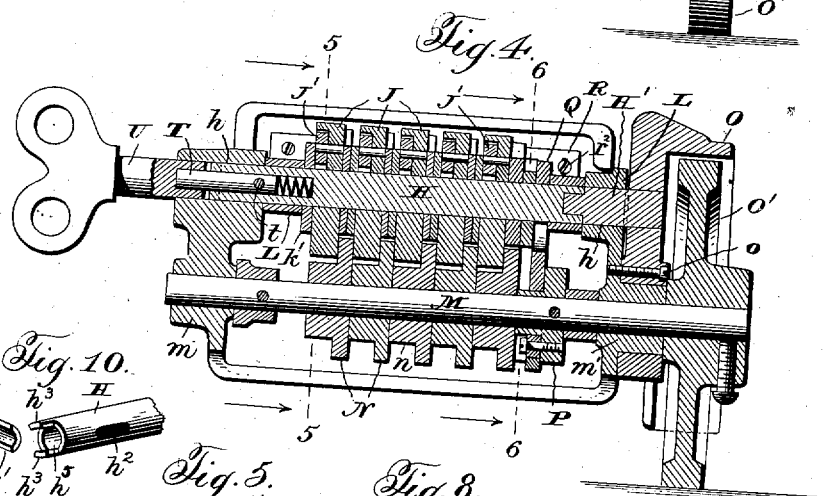
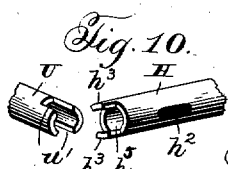
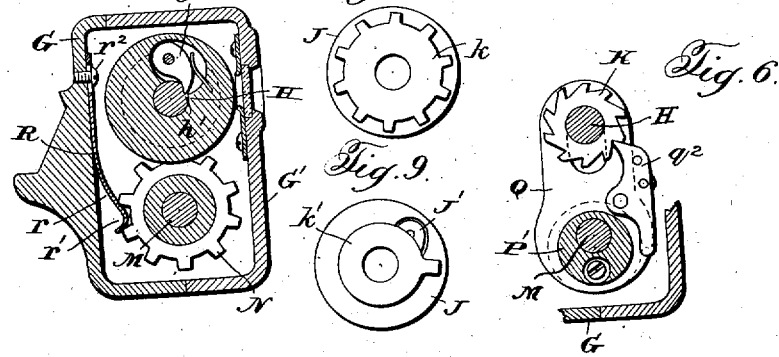

No. 888,599.

E. EK.
METER.
APPLICATION FILED JULY 3, 1906.

PATENTED MAY 26, 1908.

3 SHEETS—SHEET 3.

Witnesses:
Jas. E. Hutchinson.
Thos. R. Strath.

Inventor:
Emil Ek,
By T. H. Curtin Williams Attorneys.

UNITED STATES PATENT OFFICE.

EMIL EK, OF PORTLAND, MAINE, ASSIGNOR OF ONE-HALF TO S. ADOLF ADDE, OF PORTLAND, MAINE.

METER.

No. 888,599.     Specification of Letters Patent.     Patented May 26, 1908.

Application filed July 3, 1906. Serial No. 324,577.

*To all whom it may concern:*

Be it known that I, EMIL EK, a citizen of the United States, residing at Portland, in the county of Cumberland and State of Maine, have invented certain new and useful Improvements in Meters, of which the following is a specification, reference being had therein to the accompanying drawing.

This invention relates to an improvement in measuring machines or meters and more specifically to meters designed for measuring lumber and is of the same general type as that disclosed in my prior patent, No. 766,942, granted August 9, 1904.

The object of the present invention is the provision of improved actuating and transfer mechanisms for the registering wheels.

A further object of the invention is the provision of means for yieldingly holding the friction wheel of the meter in engagement with the article to be measured.

A further object of the invention is the provision of improved mechanism for setting the registering wheels to zero.

A still further object of the invention is the provision of an attachment for the meter whereby it can be adapted for measuring either according to the linear or metric systems.

Other objects of the invention will be apparent from the detailed description hereinafter, when read in connection with the accompanying drawings forming part hereof, and wherein like numerals of reference refer to similar parts on the several views, and wherein a preferable embodiment of my invention is shown.

Figure 1:
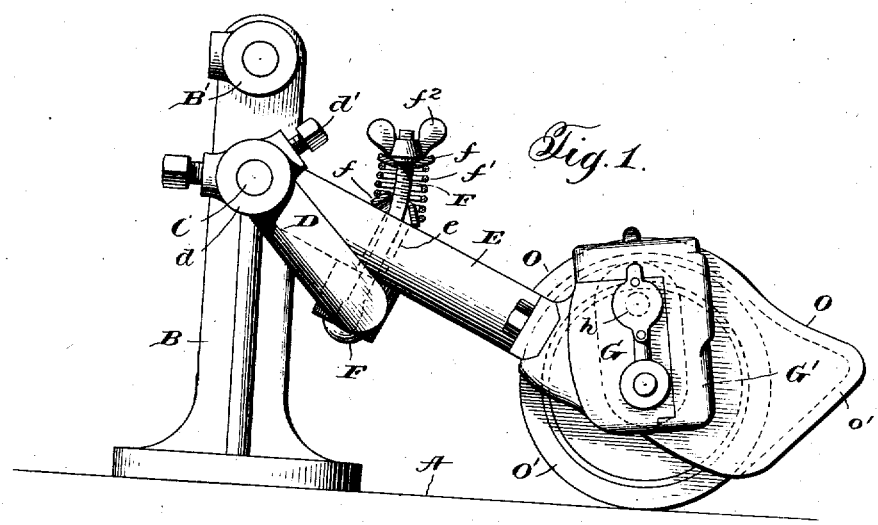
Figure 2:
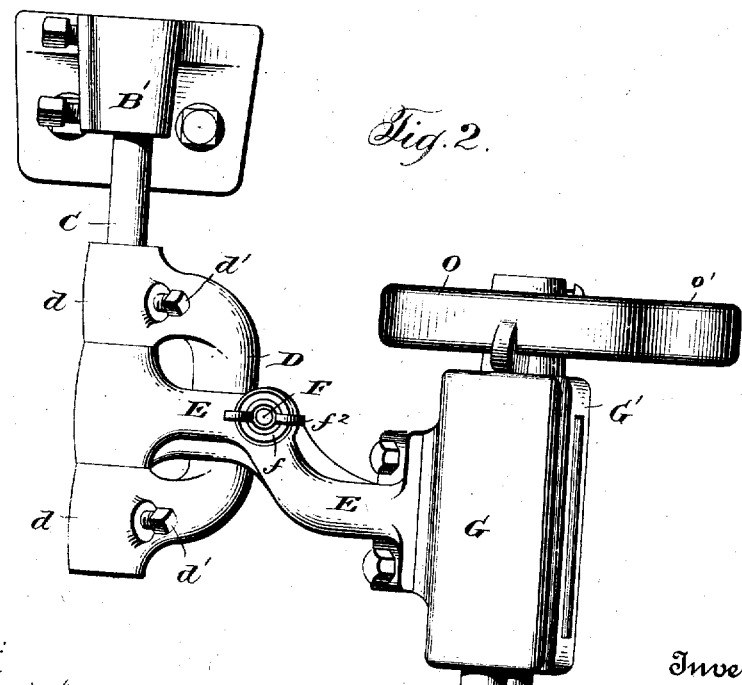
Figure 7:
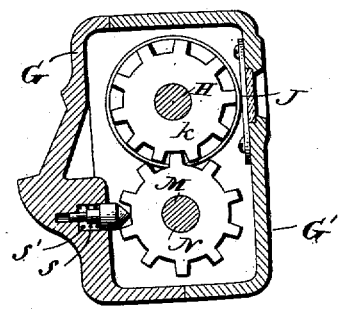
Figure 11:
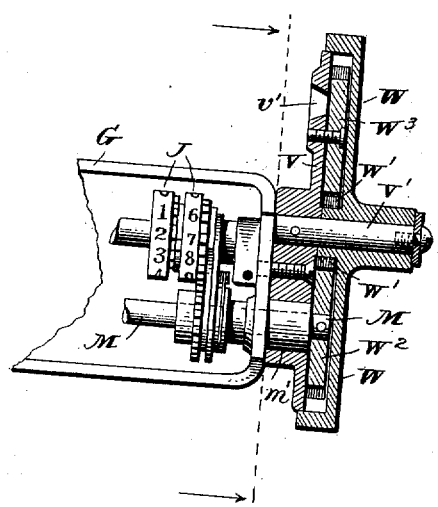
Figure 12:
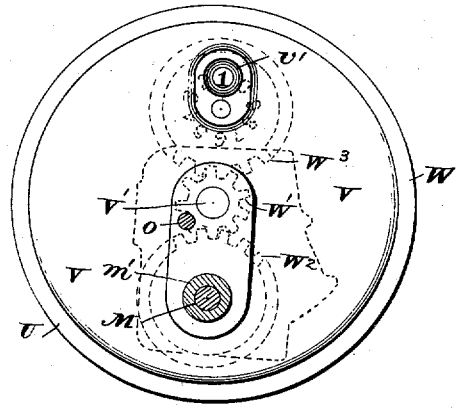

In the drawings, Figure 1 is a side elevation of the machine, showing the same in position for operating upon a strip of material; Fig. 2 is a plan view of the same; Fig. 3 is a front elevation with the front part of the inclosing casing removed; Fig. 4 is a longitudinal vertical section, parts being broken away; Fig. 5 is a transverse sectional view on the line 5—5 of Fig. 4, looking in the direction of the arrow, parts being broken away; Fig. 6, is a view similar to Fig. 5, on the line 6—6 of Fig. 4, looking in the direction of the arrow; Fig. 7 is a transverse sectional view through the casing showing another embodiment of the invention which includes a different form of pawl or stop pin for preventing movement of the registering wheels until properly actuated; Figs. 8, 9 and 10 are detail view, and Figs. 11 and 12 fragmentary views showing the attachment for adapting the meter to the metric system.

Referring now more specifically to the drawings, A designates a supporting bed or table, to which is rigidly secured in any suitable manner the bracket B, which, as in my former patent is provided with a plurality of bearings B', each having a binding screw arranged to impinge upon a stub shaft C', to secure said shaft at one end in either of the bearings B' according to the thicknesss of the work to be operated upon.

D designates a substantially U-shaped member, the outer extremities of the arms of which are provided with collars $d$, which embrace the shaft C and are adapted to be clamped thereto by means of binding screws $d'$. Upon the shaft C intermediate the arms of the U-shaped member D is sleeved an arm E so as to swing freely thereupon, the free end of said arm being connected in any suitable manner to the rear of the casing G of the meter proper.

F designates a curved upwardly extending pin, which is secured to the intermediate portion of the U-shaped member D and which passes through an aperture $e$ in the portion of the arm E overlying said U-shaped member. Loosely mounted on the projecting portion of the pin F are a pair of oppositely disposed conical washers $f$, between which is interposed a spring $f'$, said spring being maintained under tension by means of a thumbnut $f^2$, which is threaded on the upper extremity of the pin F and which bears against the upper washer $f$. From this description it will be apparent that the spring F' will yieldably hold the friction wheel of the meter in engagement with the article to be measured, the frusto-conical washers $f$ serving to keep the spring centered at all times. The downward movement of the arm E, which carries the meter, will be limited by the U-shaped member D, which can be adjusted to any desired position on the shaft C.

The side walls of the casing G are provided with oppositely disposed alined bearings $h$, in one of which is rigidly secured a thrust pin H' the ends of which project beyond the wall of the casing and the inner end of which is provided with a reduced portion.

H designates a shaft one end of which is loosely journaled in one of the bearings $h$ and the opposite end of which is provided with a cylindrical recess which is adapted to loosely receive the reduced end of the thrust pin H'. Upon the shaft H, a plurality of disks or wheels J are loosely mounted, said disks or wheels occupying parallel planes and being free to rotate upon the said shaft H in one direction, but limited in their movement thereon in the opposite direction by spring pressed pawl J', adapted to engage a longitudinally disposed rib or shoulder $h'$ in the surface of the shaft. Each of the wheels or disks carries upon its periphery indicating characters, preferably numerals, from "0" to "9," so disposed relative to the figures of the adjoining disks and the actuating mechanism that the numerals of two or more adjacent disks may be co-located to form any totals involving units, tens, hundreds, etc., according to the number of wheels employed. On the corresponding face of each wheel or disk is secured a gear wheel $k$ having ten teeth, or the same number of teeth as there are characters on the wheels or disks. On the opposite faces of the wheels or disks J are secured disks $k'$, which are provided with a single tooth similar in size and configuration to the teeth of the gear wheel $k$. The units wheel of the meter is provided on its outer face, in addition to the gear wheel $k$ with a ratchet wheel K, which is also provided with ten teeth. Secured on the shaft H between the outermost wheels or disks J and the bearings $h$ are two sleeves L, L, one of which is provided with an inwardly extending notch $l$, for a purpose to be hereinafter more particularly set forth.

M designates the operating shaft of the device, which is journaled in suitable bearings $m$ in the side walls of the casing G, directly under the shaft H. Loosely mounted on the shaft M are a plurality of gear wheels N, each of which is provided with ten teeth. The gear wheels N which are suitably spaced on the shaft M by hub like portions $n$ secured thereto, project into the spaces between the disks or wheels J and mesh with the gear wheels $k$ secured thereto. The gear wheels N are made somewhat wider than the gear wheels $k$ so that they may be periodically engaged by the single teeth $k'$, which are secured on the opposite faces of the disks or wheels. One end of the operating shaft M projects through and beyond the boss $m'$ formed integral with the casing.

O designates a wheel guard which is provided with suitable apertures in the sides thereof, which are designed to snugly engage the boss $m'$ and the projecting end of the thrust pin H'. A single screw $o$ serves to secure the wheel guard to the end wall of the casing since the wheel guard is held against movement by reason of its engagement with the boss $m'$ and the projecting end of the thrust pin H'. A friction wheel O' is rigidly secured to the projecting portion of the operating shaft M. The forward portion of the wheel guard is provided with a downwardly and rearwardly inclined front wall $o'$, the lower end of which extends into proximity to the lower portion of the periphery of the friction wheel O'. By this construction when a piece of lumber is introduced under the meter the front end thereof will first contact with the inclined front wall $o'$ of the wheel guard and raise the meter a sufficient amount to permit the friction wheel O' to easily ride upon the end thereof, thereby overcoming any tendency to cause the bending or breaking of the actuating shaft by forcing the end of the lumber directly in engagement with the friction wheel.

P designates a collar, which is rigidly secured in any suitable manner to the operating shaft M, within the casing and which has formed integral therewith an eccentric P'. Movement is imparted to the registering wheels from the actuating shaft by means of an arm Q, the rear end of which is provided with a circular aperture $q$, adapted to loosely fit over the eccentric P', and the forward end of which is provided with an elongated slot, which is adapted to loosely embrace the portion of the shaft H between the ratchet wheel K and the inner end of one of the sleeves L. Pivotally secured to one side of the lever Q is a pawl $q^2$, which is adapted to engage with the teeth of the ratchet wheel K, secured to the units wheel, when the shaft M is actuated. A spring $q^3$ serves to normally hold the said pawl in engagement with the teeth of the ratchet wheel. Adjustably secured through the medium of slot and screw connections $r^2$ to the inner side of the rear of the casing is a piece of spring metal R, which is provided at its lower edge with a plurality of fingers $r$ integrally formed therewith, which project beneath the gear wheels N on the shaft M and terminate in upwardly bent inverted V-shaped portions $r'$ which normally engage the teeth of said gear wheels. It will be apparent that the upwardly bent portions $r'$ of the fingers R will normally prevent rotation of the gear wheels N, and consequently of the registering wheels or disks J, which are geared therewith, but will, owing to their V-shape permit said gears to rotate one step at a time when the machine is in operation and will also permit said gear wheels to rotate rearwardly when it is desired to set the registering wheels to zero. Instead of the spring fingers $r$, referred to above, I may employ the construction illustrated in Fig. 6, of the drawings. In this form the casing G is provided with a plurality of sockets $s$, which directly underlie the gear wheels N and slidably secured in said sockets are a plurality of pawls or stop pins, the upper ends of which are of inverted V-shape, and which are normally held in engagement with the teeth of the gear wheels by coiled springs $s'$, which are secured within the sockets and the ends of which bear against the bottom of said sockets and abutments or shoulders formed on the pawls. The front portion of the casing G is provided with a covering plate G', in which is a sight opening, through which the characters on the registering wheels may be observed.

The operation of my machine as thus far described is as follows: The strip of material to be measured is slipped beneath the friction wheel O' of the meter, which will be yieldably held in engagement therewith by the weight of the meter and by means of the spring F', which engages the arm E, and is moved longitudinally to cause the rotation of said friction wheel. The rotation of the wheel O' will also cause the rotation of the eccentric P', which will when the friction wheel has revolved once cause the arm Q through its pawl $q^2$ to actuate the ratchet wheel secured to the units wheel and move the same one step. On the tenth revolution of the friction wheel the units wheel will be moved one step to cause the character "zero" to appear through the sight opening $g$ of the casing and the single tooth of the disk K', which is secured on the opposite side of the units wheel, will simultaneously engage one of the gear wheels N and move the same a distance equal to one tooth, and as the tens wheel is geared to said gear wheel, it will also be moved one step to present its character "1" in longitudinal alinement with the character "0" of the units wheel, thereby forming the number "10". It will be observed that the tens wheel will not be moved again until the units wheel has been actuated ten times, when it will again be shifted one step to form the numeral "20". The progressive operation of the third or hundreds and fourth or tens-of-hundreds wheels, and so on, according to the number of wheels employed, is the same as that just described in relation to the units and tens wheels.

I will now proceed to describe the mechanism employed for resetting the register wheels or disks to zero. One end of the shaft H is provided with a longitudinally disposed cylindrical recess therein, $h^5$, and with an elongated slot $h^2$ in the exterior thereof, which communicates with said cylindrical recess. The end of said shaft H is also provided with a pair of lugs $h^3$ for a purpose to be more fully hereinafter set forth. T designates a rod fitting loosely in the cylindrical opening in the end of the shaft H and projecting beyond the end thereof. The rod T is provided with a laterally projecting pin or finger $t$, which projects through the slot $h^2$ in the shaft H and is normally held in engagement with a notch $h^4$ formed in the inner face of the bearing $h$ by means of a spring T', which is interposed between the end of the pin T and the base of the cylindrical recess in the shaft H, thereby normally holding said shaft against rotation during the operation of the meter. It will be noted that the locking mechanism is wholly concealed within the casing and that the same cannot be actuated except with the particular form of key to be hereinafter described.

During the operation of the machine the indicator wheels J rotate freely on the shaft H in the direction of the arrow, said shaft being held against rotation as hereinbefore set forth. When it is desired to set the indicating wheels to zero a key U is used, said key being provided with a cylindrical recess in its end, adapted to fit over the end of the rod T and with a pair of notches $u'$ which are adapted to engage the lugs $h^3$ on the end of the shaft H. The cylindrical recess in the key is slightly shorter than the projecting portion of the rod T, so that when said key is placed in position on said rod, it is necessary to move the same longitudinally before the notches in the end of the key can be made to engage the lugs on the end of the shaft. This longitudinal movement of the rod T causes the pin $t$ projecting therefrom to leave the notch $h^4$ formed in the inner face of the bearing $h$ and to enter the inwardly extending notch $l$ formed in the sleeve L. The key U is then turned to bring the longitudinal shoulder $h'$ of the shaft H into engagement with all of the pawls $j$ of the registering wheels J, and a continued rotation of the shaft will cause all of the wheels to be simultaneously rotated and brought to the position desired, for instance, with the line of zeros opposite the sight opening of the casing, when the key is withdrawn and the pin $p$ on the rod T again moves into the notch $h^4$ and locks the shaft against rotation.

Ordinarily the meter is used to measure according to the linear system and hence the periphery of the friction wheel O' measures one foot around. I have, however, found that it is sometimes desirable to utilize a meter of this character for measuring according to the metric system and I have therefore provided an attachment for my machine for that purpose. To apply the attachment the wheel guard O and friction wheel O' are first removed from the machine. The attachment comprises a disk V which is provided adjacent the lower edge thereof with a circular recess which is adapted to fit over the boss $m'$ and adjacent the center thereof with a laterally projecting stub shaft V' which when the disk is secured in position directly overlies the actuating shaft M of the meter. The disk V is secured to the end wall of the casing of the meter by a suitable screw, the outer projecting end of the thrust pin H being either cut off flush with the outer surface of the end wall of the casing or the disk may be provided with a suitable recess to receive the end of the thrust pin, similar to that formed in the wheel guard, hereinbefore described.

W designates a friction wheel which is loosely mounted on the stub shaft V' and is provided with an inwardly extending flange which extends into proximity to the periphery of the disk V. Projecting inwardly from the center of the friction wheel W is a gear wheel W' which meshes with a gear wheel W² which is rigidly secured to the projecting end of the actuating shaft M of the meter.

W³ designates a gear wheel of the same size as the gear wheel W² which is secured to the disk V and meshes with the gear wheel W' carried by the friction wheel W. The gear wheel W³ carries around one side thereof the indicating numerals, from "0" to "9" and the disk V is provided with a suitable opening v' therein to permit the inspection of said numerals. The measuring wheel W is one-half meter in circumference and the gears W² and W³ have twice as many teeth as the pinion W'. From this construction it will be apparent that when the attachment is employed the numerals of the gear W³ will indicate decimeters while the registering wheels T of the meter will indicate meters.

I do not desire to limit myself to the precise form and construction shown in the drawings, as it is obvious that many minor changes might be made thereto without departing from the spirit of the invention.

Having thus described the invention what I claim as new and desire to secure by Letters Patent is:

1. In a device of the character described, an indicating shaft, an actuating shaft, a ratchet wheel secured to said indicating shaft, an arm loosely supported upon said indicating and actuating shafts, a pawl carried by said arm and adapted to engage the ratchet wheel on the indicating shaft, and means for reciprocating said arm.

2. In a device of the character described, an indicating shaft, an actuating shaft, a ratchet wheel secured to said indicating shaft, an arm loosely supported upon said indicating and actuating shafts, a pawl carried by said arm and adapted to engage the ratchet wheel on the indicating shaft, and means carried by said actuating shaft for reciprocating said arm.

3. In a device of the character described, an indicating shaft, an actuating shaft, a ratchet wheel secured to said indicating shaft, an arm loosely supported upon said indicating and actuating shafts, a pawl carried by said arm and adapted to engage the ratchet wheel on the indicating shaft, and an eccentric carried by the actuating shaft and engaging said arm to effect its reciprocation.

4. In a device of the character described, an indicator wheel shaft, an indicator wheel loosely mounted thereon a ratchet wheel carried by said indicator wheel, means for imparting a step by step movement to said indicator wheel, including an actuating shaft, an eccentric mounted thereon, an arm loosely mounted on said eccentric and provided with an elongated slot adapted to embrace the indicator wheel shaft, and a pawl carried by said arm and adapted to coöperate with the ratchet wheel on the indicator wheel.

5. In a device of the character described, an indicating wheel shaft, a pair of indicator wheels loosely mounted thereon and provided on their opposite faces with varying toothed portions, a ratchet wheel carried by one of said indicator wheels, an actuating shaft, a gear wheel loosely mounted thereon, said gear wheel being arranged to constantly mesh with the toothed portion on one of said indicator wheels and to periodically engage the toothed portion on the other of said wheels, a reciprocatory arm loosely supported upon said indicating and actuating shafts, a pawl carried thereby and adapted to coöperate with the ratchet wheel carried by the indicator wheel, and means for imparting a reciprocatory movement to said arm upon the rotation of the actuating shaft.

6. In a device of the character described, a casing, a shaft mounted therein, a plurality of indicator wheels loosely mounted on said shaft, means permitting the rotation of said wheels on said shaft in one direction and limiting their rotation thereon in the opposite direction, a lock operatively associated with said shaft and adapted to engage a portion of the casing to normally prevent rotation thereof, and a separate key for releasing said lock to permit the rotation of said shaft.

7. In a device of the character described, a casing, a shaft mounted therein, a plurality of indicator wheels loosely mounted thereon, means permitting the rotation of said wheels on said shaft in one direction and limiting their rotation thereon in the opposite direction, and a lock operatively associated with said shaft and normally engaging a portion of the casing to prevent rotation thereof, said lock being located wholly within the casing.

8. In a device of the character described, a casing a shaft journaled therein, a plurality of indicator wheels loosely mounted thereon, means permitting the rotation of said wheels on said shaft in one direction and limiting their rotation thereon in the opposite direction, a lock operatively associated with said shaft and normally engaging a portion of the casing to prevent rotation thereof, said lock being concealed wholly within the casing, and a separate key for releasing said lock to permit the actuation of said shaft.

9. In a device of the character described, a casing a shaft journaled therein, a plurality of indicator wheels loosely mounted thereon, means permitting the rotation of said wheels on said shaft in one direction and limiting their rotation thereon in the opposite direction, a lock operatively associated with said shaft and normally engaging a portion of the casing to prevent rotation thereof, and a separate key for said lock, said key being arranged during its initial movement to release the lock and subsequently to engage a portion of the shaft to permit the rotation thereof.

10. In a device of the character described, a casing, a shaft mounted therein, a plurality of indicator wheels loosely mounted thereon, means permitting the rotation of said wheels on said shaft in one direction and limiting their rotation thereon in the opposite direction, a lock operatively associated with said shaft and normally engaging a portion of the casing to prevent rotation thereof, said lock being located wholly within the casing, and a separate key for said lock, said key being arranged during its initial movement to release the lock and subsequently to engage a portion of the shaft to permit the rotation thereof.

11. In a device of the character described, a casing, a shaft journaled therein and having in one end thereof a longitudinally disposed recess, a plurality of indicator wheels loosely mounted thereon, means permitting the rotation of said indicator wheels on said shaft in one direction and limiting their rotation thereon in the opposite direction, a pin slidably secured in the recess in the end of the shaft and provided with a laterally extending finger projecting through said shaft, and a spring interposed between the pin and the bottom of the recess, said spring serving to normally hold the finger on said pin in engagement with a notch formed in the casing and thereby prevent the rotation of said shaft.

12. In a device of the character described, a casing, a shaft journaled therein and provided with a longitudinally disposed recess in one end thereof and with engaging portions projecting from the end thereof, a plurality of indicator wheels loosely mounted on said shaft, means permitting the rotation of said wheels on said shaft in one direction and limiting their rotation thereon in the opposite direction, a pin yieldably secured in the recess in the shaft and projecting beyond the end thereof, said pin being provided with a laterally extending finger projecting through the shaft and normally engaging a notch in the casing to prevent rotation of said shaft, and a key provided with a longitudinally disposed recess adapted to engage the projecting portion of the pin, and with engaging portions adapted to interlock with the engaging portions projecting from the end of the shaft.

13. In combination with a measuring machine of the character described, a support comprising a bracket, a shaft secured thereon and projecting laterally therefrom, a U-shaped member secured to said shaft, and an arm pivotally secured on said shaft intermediate the arms of said U-shaped member and carrying the machine at its free end.

14. In combination with a measuring machine of the character described, a support comprising a bracket, a shaft secured thereon and projecting laterally therefrom, a substantially U-shaped member adjustably secured on said shaft, and an arm pivotally secured on said shaft intermediate the arms of said U-shaped member and carrying the machine at its free end.

15. In combination with a measuring machine of the character described, a support comprising a bracket, a swinging arm interposed between said bracket and machine, an adjustable stop carried by said support and underlying said arm, and yieldable means interposed between said arm and stop for normally forcing said arm downwardly.

16. In combination with a measuring machine of the character described, a support comprising a bracket, a swinging arm between said bracket and machine, yieldable means carried by the support for normally forcing said arm downwardly, and means for limiting the downward movement of said arm.

17. In combination with a measuring machine of the character described, a support comprising a bracket, a swinging arm between said bracket and machine, yieldable means for normally forcing said arm downwardly, and an adjustable stop beneath said arm for limiting the downward movement thereof.

18. In combination with a measuring machine of the character described, a support comprising a bracket, a shaft secured thereon and projecting laterally therefrom, a swinging arm on said shaft carrying the machine at its free end, a stop secured to said shaft and underlying said arm, an upwardly extending pin secured to said stop and projecting through the overlying portion of said arm, and a coil spring secured around the projecting portion of said pin.

19. In combination with a measuring machine of the character described, a support comprising a bracket, a laterally projecting shaft secured to said bracket, a swinging arm on said shaft carrying the machine at its free end, a stop secured to said shaft and underlying said arm, a curved pin secured to said stop and projecting through the overlying portion of said arm, a pair of oppositely disposed frusto-conical washers loosely mounted on said pin, a coil spring interposed between said washers, and a thumb nut secured on the free end of said pin.

20. In a machine for measuring lumber, indicating means, and interchangeable actuating instrumentalities therefor including a wheel adapted to engage the work, whereby the machine may be adapted for measuring according to varying systems of measurement.

21. In combination with the actuating shaft of a measuring machine, interchangeable actuating means therefor including a wheel adapted to engage the work, whereby the machine may be adapted for measuring according to varying systems of measurement.

22. In a machine for measuring lumber, a casing, indicating instrumentalities within the casing, actuating means therefor including an actuating shaft journaled within the casing and projecting beyond one side thereof, a stub shaft secured to the casing, a gear wheel removably secured to the projecting portion of the actuating shaft, and an actuating wheel adapted to engage the work loosely mounted on the stub shaft and geared to the gear wheel on the actuating shaft.

23. In a machine for measuring lumber, a casing, indicating instrumentalities within the casing, operating means therefor including an actuating shaft journaled within the casing and projecting beyond one side thereof, a stub shaft removably secured to the casing adjacent the projecting portion of the actuating shaft, a gear wheel removably secured to the projecting portion of the actuating shaft, and an actuating wheel adapted to engage the work loosely mounted on the stub shaft and geared with said gear wheel.

24. In a device of the character described, a casing, indicating instrumentalities within the casing, actuating means therefor including an actuating shaft, a supplemental indicating dial, an actuating wheel, and gearing between the actuating wheel and the indicating instrumentalities within the casing and between the actuating wheel and the supplemental indicating dial.

25. In a device of the character described, a casing, indicating instrumentalities within the casing, actuating means therefor including an actuating shaft, journaled within the casing and projecting beyond one side thereof, a plate secured to the end of the casing and provided with a laterally projecting stub shaft, a geared indicating dial mounted on said plate, a gear wheel secured to the projecting end of the actuating shaft, and an actuating wheel loosely mounted on the stub shaft, said actuating wheel being provided with a pinion meshing with the said gear wheel and geared indicating dial.

26. In a device of the character described, a casing, indicating instrumentalities within the casing, and actuating mechanism therefor including an actuating wheel, said casing being provided with a portion extending beyond said actuating wheel and adapted to be engaged by the work when passed therebeneath.

27. In a device of the character described, a casing, indicating instrumentalities within the casing, and an actuating wheel for said indicating instrumentalities, said casing having a portion extending beyond said actuating wheel and provided with a rearwardly inclined front wall, the lower end of which extends into proximity to the lower portion of said actuating wheel.

28. In a device of the character described, a casing, indicating instrumentalities within the casing, an actuating wheel for said indicating instrumentalities, and a wheel guard secured to said casing and having a portion extending beyond said actuating wheel and adapted to be engaged by the work when passed therebeneath.

29. In a device of the character described, a casing, indicating instrumentalities within the casing, an actuating wheel therefor, and a wheel guard secured to the casing, said wheel guard extending beyond the actuating wheel and having a rearwardly inclined front wall.

30. In a device of the character described, a measuring machine mounted to swing in a vertical plane, said measuring machine including indicating instrumentalities and an actuating wheel therefor, and means extending beyond said actuating wheel and adapted to be engaged by the work when passed therebeneath.

In testimony whereof I affix my signature in presence of two witnesses.

EMIL EK.

Witnesses:
WILBUR C. WHELDEN,
ALICE MATTHEWS.